(12) United States Patent
An

(10) Patent No.: US 7,070,200 B2
(45) Date of Patent: Jul. 4, 2006

(54) AIR BAG CASE ASSEMBLY

(75) Inventor: Jung Bae An, Kyunggi-do (KR)

(73) Assignee: Hyundai Mobis Co., Ltd., Yongin-shi (KR)

( * ) Notice: Subject to any disclaimer, the term of this patent is extended or adjusted under 35 U.S.C. 154(b) by 353 days.

(21) Appl. No.: 10/746,350

(22) Filed: Dec. 29, 2003

(65) Prior Publication Data

US 2005/0140126 A1    Jun. 30, 2005

(51) Int. Cl.
*B60R 21/203* (2006.01)
(52) U.S. Cl. .................... 280/728.2; 280/731
(58) Field of Classification Search ............. 280/731, 280/728.2; 74/552, 492; 403/252, 331
See application file for complete search history.

(56) References Cited

U.S. PATENT DOCUMENTS

| | | | | |
|---|---|---|---|---|
| 1,303,090 A | * | 5/1919 | McCray | ............ 30/308.3 |
| 2,107,238 A | * | 2/1938 | Des Roches | ............ 403/331 |
| 5,382,046 A | * | 1/1995 | Cuevas | ............ 280/728.2 |
| 5,409,256 A | * | 4/1995 | Gordon et al. | ............ 280/728.2 |
| 5,470,099 A | * | 11/1995 | Williams | ............ 280/728.2 |
| 5,931,489 A | * | 8/1999 | Damman et al. | ............ 280/728.2 |
| 6,149,184 A | * | 11/2000 | Ennis et al. | ............ 280/728.2 |

* cited by examiner

*Primary Examiner*—David R. Dunn
*Assistant Examiner*—Drew Brown
(74) *Attorney, Agent, or Firm*—Greenblum & Bernstein, P.L.C.

(57) ABSTRACT

Disclosed herein is an air bag case assembly for vehicles, which comprises a track mounted to an air bag case, and a rail mounted to the hub of a steering wheel and configured to allow the track to engage therein. In a state wherein the track is aligned so as to be engaged into grooves of the rail along a circumferential direction of the hub of the steering wheel, as the air bag case is rotated so that the track is inserted into the grooves of the rail, the track and rail are engaged with each other, thereby allowing the air bag case to be firmly assembled to the hub of the steering wheel.

11 Claims, 3 Drawing Sheets

AIR BAG CASE ASSEMBLY

BACKGROUND OF THE INVENTION

1. Field of the Invention

The present invention relates to an air bag case assembly, and more particularly to an air bag case assembly comprising a track mounted to an air bag case, and a rail mounted to the hub of a steering wheel and configured to allow the track to engage therein.

2. Description of the Related Art

Generally, an air bag system for a vehicle is mounted to a steering wheel for protecting a driver from shock when a collision of the vehicle occurs. Furthermore, the air bag system is mounted to the steering wheel in a vertically movable manner, thereby further functioning to turn on/off a horn switch mounted to the steering wheel.

Referring to FIG. 1 illustrating a conventional air bag system, it comprises an air bag case mounted to a hub 2 provided in a steering wheel 1, an inflator 14 for ejecting high pressure gas as soon as a collision of the vehicle is detected by an impact sensor, and an air bag 16 accommodated in the air bag case so as to be instantly expanded toward a driver by means of the high pressure gas ejected from the inflator 14.

The air bag case comprises an air bag cover 10 for covering the open upper surface of the hub 2 of the steering wheel 1, a retainer 11 laid on the hub 2 of the steering wheel 1 for supporting the inflator 14 and air bag 16, a rib 12 protruding downwardly from the air bag cover 10 so as to surround the retainer 11 and be fastened to the retainer 11 by means of rivets 20, and a bracket 13 fastened at one side thereof to both the rib 12 and retainer 11 by means of the rivets 20 and fastened at the other side thereof to one side surface of the hub 2 of the steering wheel 1 by means of bolts 22.

The air bag cover 10 is formed with a tear line 17 at a region 10A located inside the rib 12 so that the air bag cover 10 is easily and smoothly broken along the tear line 17 during the expansion of the air bag 16.

Now, the operation of the conventional air bag system configured as stated above will be explained.

When a collision of the vehicle is detected by means of the impact sensor, the high pressure gas is ejected from the inflator 14 into the air bag 16. As the air bag 16 is expanded by means of the high pressure gas filled therein, it causes the cutting of the air bag cover 10 along the tear line 17, thereby being expanded toward the driver.

In such a conventional air bag system, however, since the air bag case is assembled to the steering wheel 1 as the bracket 13 is fastened together with both the rib 12 and retainer 11 by means of the rivets 20, and further fastened to the hub 2 of the steering wheel 1 by means of the bolts 22, there exist several problems in that the number of assembly elements is large, separate tools for fastening the rivets 20 and bolts 22 are required, such a fastening work is performed within a relatively narrow space, and an operator has to bend his/her back in order to perform the fastening. For these reasons, assembly cost and time of the air bag case are disadvantageously increased.

Furthermore, since the bolts are liable to be worn at their screw threads during the screw fastening thereof, the bolt 22 should be repeatedly fastened several times.

SUMMARY OF THE INVENTION

Therefore, the present invention has been made in view of the above problems, and it is an object of the present invention to provide an air bag case assembly, which enables the air bag case to be easily assembled/disassembled to or from a steering wheel, and minimizes breakage of fastening elements.

In accordance with the present invention, the above and other objects can be accomplished by the provision of an air bag case assembly comprising: an air bag case disposed on a hub centrally provided in a steering wheel, the air bag case being installed therein with an air bag, and an inflator for supplying expansion gas to the air bag; a rail mounted to the hub of the steering wheel, the rail having a first groove defined at the side of the air bag case, and a second groove defined at the side of the hub of the steering wheel, the first groove having a width narrower than a width of the second groove; and a track mounted to the air bag case, the track having a first portion located at the side of the air bag case, and a second portion located at the side of the hub of the steering wheel, the first portion having a width narrower than a width of the second portion, in correspondence to the grooves of the rail, so that the track is engaged into the grooves of the rail, thereby allowing the air bag case to be assembled to the hub of the steering wheel.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
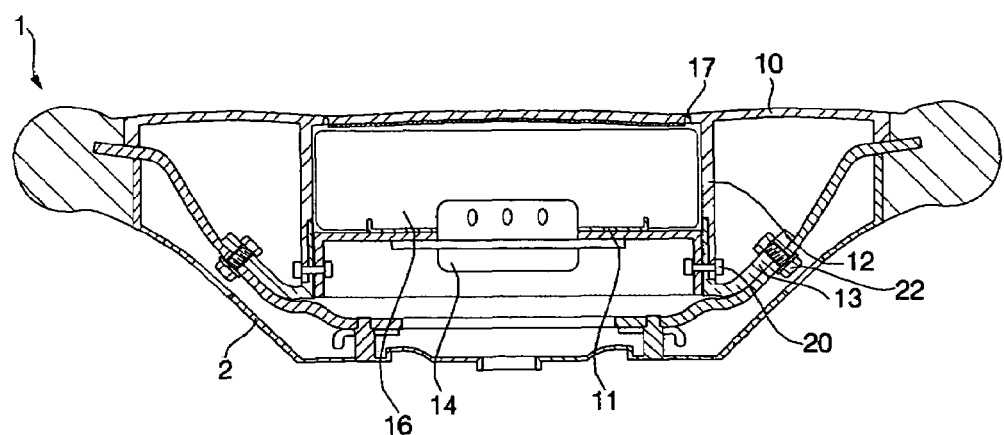
FIG. 1 is a sectional view illustrating a conventional air bag system.
Figure 2:
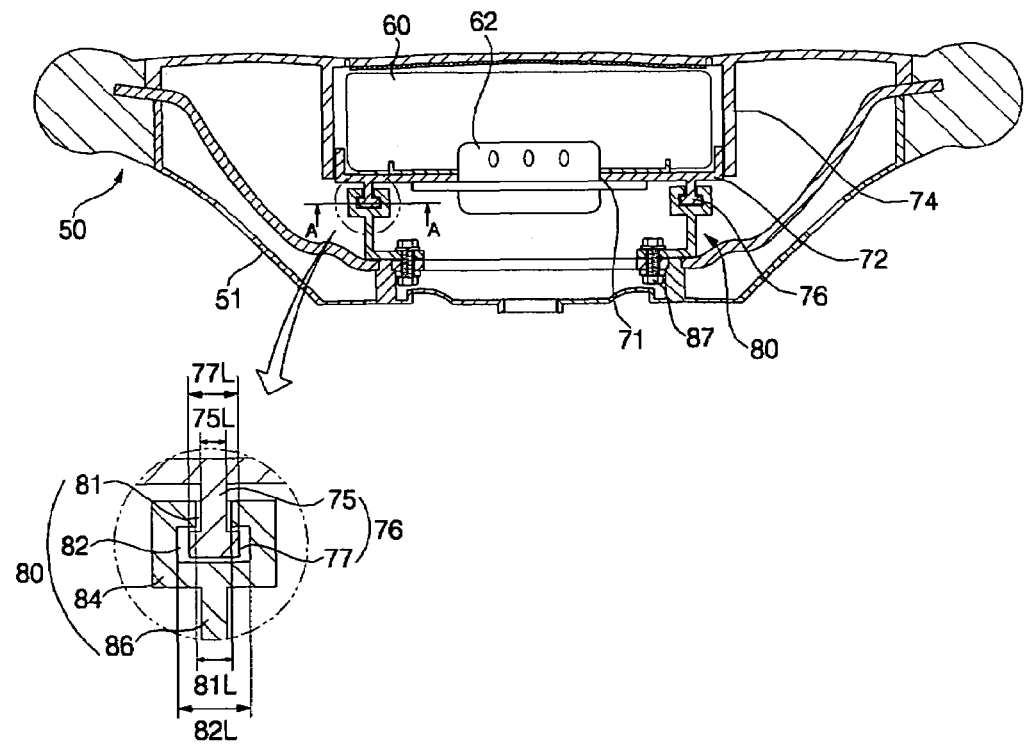
FIG. 2 is a sectional view illustrating an air bag case assembly in accordance with the present invention.

Now, a preferred embodiment of the present invention will be described in detail with reference to the accompanying drawings.

As shown in FIGS. 2 to 6 illustrating an air bag case assembly for a vehicle in accordance with the present invention, it comprises a hub 51 located at the center of a steering wheel 50 and having an open upper surface, an air bag case mounted inside the hub 51 of the steering wheel 50, a track 76 mounted at the lower surface of the air bag case, and a rail 80 mounted to the bottom of the hub 51 of the steering wheel 50 and configured to allow the track 76 to engage therein. Within the air bag case there are received an air bag 60, and an inflator 62 for supplying expansion gas into the air bag 60 when a collision of the vehicle occurs.

The air bag case comprises an air bag housing 72, and an air bag cover 74. The air bag housing 72 has an open upper surface and is formed at the lower surface thereof with the track 76. The air bag cover 74 is configured to cover the open upper surface of the air bag housing 72. The air bag housing 72 and air bag cover 74 are fastened to each other by means of rivets or hooks.

The track 76 protrudes downwardly and vertically from the air bag housing 72 toward the hub 51 of the steering wheel 50. Along a vertical length thereof, the track 76 is divided into a first portion 75 located at the side of the air bag case, and a second portion 77 located at the side of the hub 51 of the steering wheel 50. The first portion 75 of the track 76 has a width 75L narrower than a width 77L of the second portion 77.

The rail 80 protrudes upwardly and vertically from the hub 51 of the steering wheel 50 toward the air bag housing 72 in such a manner that it is vertically aligned with the track 76. In correspondence to the track 76, the rail 80 is formed with a first groove 81 defined at the side of the air bag case, and a second groove 82 defined at the side of the hub 51 of the steering wheel 50. The first groove 81 of the rail 80 has a width 81L narrower than a width 82L of the second groove 82. With this configuration, once the first and second portions 75 and 77 of the track 76 are engaged into the first and second grooves 81 and 82 of the rail 80, the track 76 cannot be separated from the upper side of the rail 80. Thereby, the air bag case is firmly assembled to the hub 51 of the steering wheel 50. According to a preferred embodiment of the present invention, the track 76 and the grooves 81 and 82 of the rail 80 have an upside-down "T"-shaped cross sectional shape.

The grooves 81 and 82 of the rail 80 are open at their ends in a circumferential direction of the hub 51 of the steering wheel 50. The track 76 and the grooves 81 and 82 of the rail 80 are arranged along a part of the circumference of the hub 51 of the steering wheel 50, thereby defining an arc shape having the same curvature as the hub 51 of the steering wheel 50. As a result, in a state wherein the track 76 is aligned with the grooves 81 and 82 of the rail 80 along the circumferential direction of the hub 51 of the steering wheel 50, as the air bag case rotates so as to move toward the grooves 81 and 82 of the rail 80 along the circumferential direction of the hub 51 of the steering wheel 50, the track 76 can be inserted through the open ends of the grooves 81 and 82 of the rail 80 along the circumferential direction of the hub 51 of the steering wheel 50. In this case, the track 76 may be pressed into the grooves 81 and 82 of the rail 80 in an interference fit manner so as not to move after insertion.

The air bag housing 72 is centrally formed at the bottom thereof with a hole 71 for the seating of the inflator 62. In this case, the track 76 is formed along the outer rim region of the air bag housing 72 so that it is located out of the hole 71 of the air bag housing 72. The track 76 may be integrally formed with the air bag housing 72, or may be separately prepared and mounted to the air bag housing 72 by using welding, bonding, and the like.

The rail 80 is divided into a connector 84, and a stand 86 located between the connector 84 and the hub 51 of the steering wheel 50. In the connector 84 are formed the first and second grooves 81 and 82 of the rail 80, which are configured to allow the track 76 to engage therein.

The stand 86 is formed to have a certain vertical length so that, in an assembled state of the air bag case, the connector 84 comes into contact with the air bag housing 72, and the air bag cover 74 is positioned level with the upper surface of the hub 51 of the steering wheel 50.

The stand 86 may be integrally formed with the connector 84, or may be separately prepared and welded to the connector 84. A portion of the stand 86 at the side of the hub 51 of the steering wheel 50 is bent perpendicular to the remaining portion thereof so that the bent portion of the stand 86 comes into contact with the bottom of the hub 51 of the steering wheel 50. In this state, the contact end of the stand 86 is fastened to the edge of the hub 51 of the steering wheel by means of bolts 87.

The air bag case assembly in accordance with the present invention may further comprise a stopper 91~94. The stopper 91~94 serves to fix the track 76 and the rail 80 at their engaged position so that the track 76 does not move after it is inserted into the grooves 81 and 82 of the rail 80.

The stopper comprises two pairs of movable jaws 91 and 92, and two pairs of fixed jaws 93 and 94. The movable jaws 91 and 92 protrude outwardly perpendicular to the left and right side surfaces of the track 76 toward the grooves 81 and 82 of the rail 80. The movable jaws 91 are spaced apart from the movable jaws 92 in an engagement direction (denoted as arrow M) between the track 76 and rail 80. The fixed jaws 93 and 94 protrude inwardly from the grooves 81 and 82 of the rail 80 so that they are caught by the movable jaws 91 and 92 between the movable jaws 91 and 92 in a state wherein the track 76 is engaged in the rail 80.

In this case, the track 76 is formed to have a certain width 76L so that the second portion 77 of the track 76 located at the side of the hub 51 of the steering wheel 50 can pass between the fixed jaws 93 and between the fixed jaws 94. The movable jaws 91 and 92 protruding outwardly from the track 76 have maximum protruding lengths 91L and 92L, respectively, which are shorter than maximum protruding lengths 93L and 94L of the fixed jaws 93 and 94 protruding inwardly from the grooves 81 and 82 of the rail 80.

Among the two pairs of the movable jaws 91 and 92, the pair of the movable jaws 91 is first inserted into the grooves 81 and 82 of the rail 80. That is, the pair of the movable jaws 91 is located at the front end of the track 76. The front end pair of the movable jaws 91 is formed with a pair of tapers 91T at the surfaces thereof facing the engagement direction between the track 76 and rail 80, in order to allow the movable jaws 91 to easily pass between the fixed jaws 93 and between the fixed jaws 94. That is, the movable jaws 91 protruding from the track 76 have a protruding length, which is gradually reduced toward the engagement direction of the arrow M between the rail 80 and track 76.

The remaining pair of the movable jaws 92 located at the rear end of the track 76, namely, the rear end pair of the movable jaws 92 are preferably formed to have a rectangular cross sectional shape, in order to prevent them from passing between the fixed jaws 94.

The fixed jaws 93 and 94 are formed with tapers 93T and 94T at the surfaces thereof facing the opposite direction of the engagement direction of the arrow M between the track 76 and rail 80, in order to allow the movable jaws 91 to easily pass between the fixed jaws 93 and between the fixed jaws 94. That is, the fixed jaws 93 and 94 protruding from the rail 80 have a protruding length, which is gradually increased toward the engagement direction of the arrow M between the rail 80 and track 76.

As can be seen from the above description, in a state wherein the track 76 is engaged in the rail 80, the stopper serves to prevent the track 76 from moving toward the opposite direction of the engagement direction of the arrow M between the track 76 and rail 80 by virtue of the fact that the front end pair of the movable jaws 91 are caught by the fixed jaws 93. Further, the stopper serves to prevent the track 76 from moving toward the engagement direction of the arrow M between the track 76 and rail 80 by virtue of the fact that the rear end pair of the movable jaws 92 are caught by the fixed jaws 94.

Now, the operation of the air bag case configured as stated above will be explained.

Figure 3:
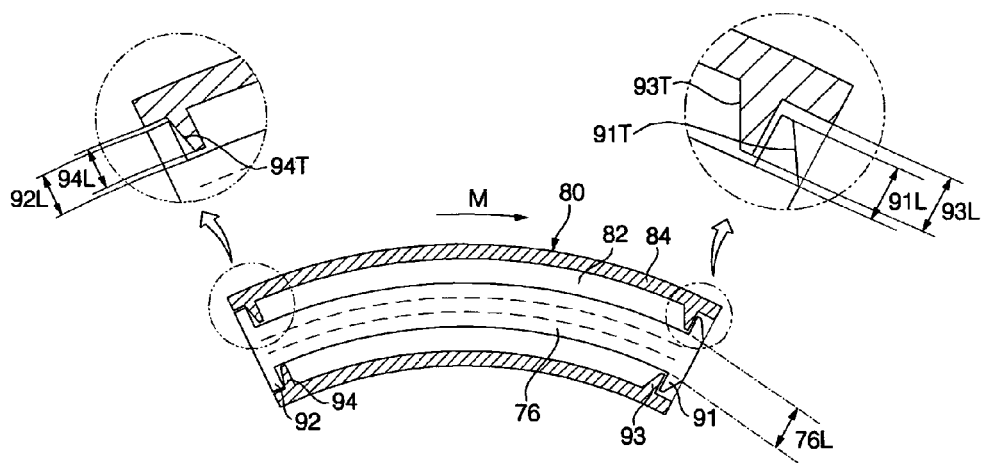
FIG. 3 is a cross sectional view taken along a line A—A shown in FIG. 2.
Figure 4:
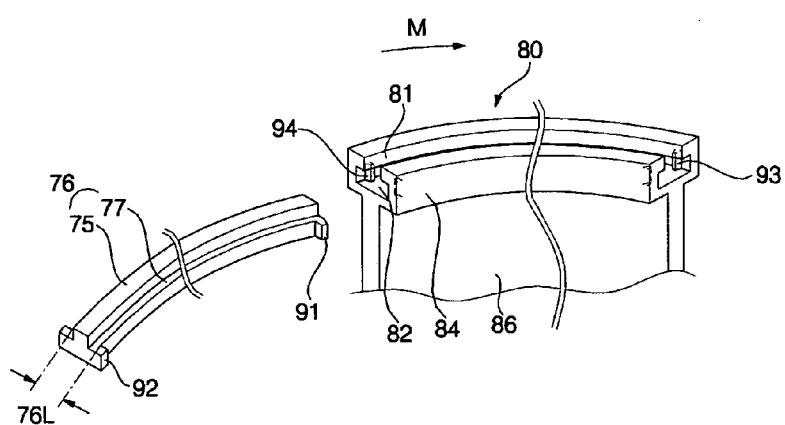
FIG. 4 is an exploded perspective view illustrating a track and a rail in accordance with the present invention.
Figure 5:
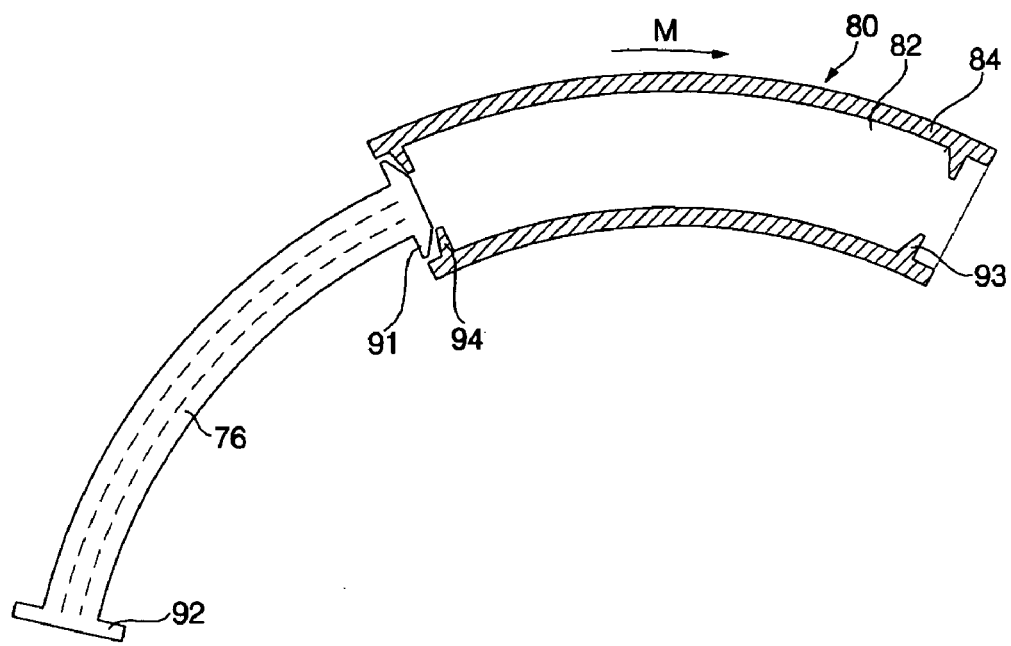
FIGS. 5 and 6 are sectional views illustrating a subsequent engagement process between the track and rail in accordance with the present invention.
Figure 6:
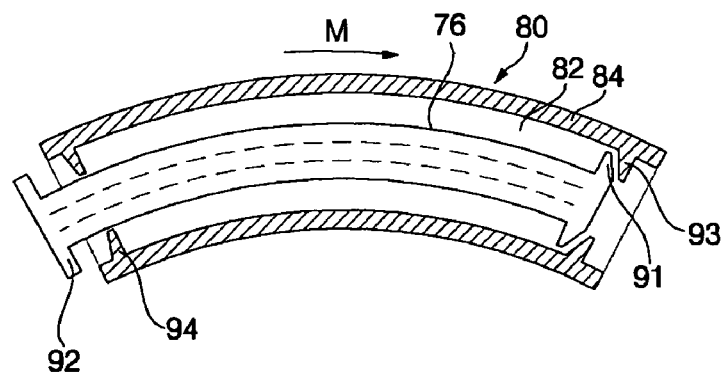

After the track 76 and the rail 80 are mounted to the air bag housing 72 and the hub 51 of the steering wheel 50, respectively, as shown in FIG. 4 or 5, the air bag housing 72 is positioned so as to ready the track 76 for allowing it to engage into the grooves 81 and 82 of the rail 80 along the circumferential direction of the steering wheel 50. After that, as shown in FIG. 3 or 6, the air bag housing 72 is rotated along the direction of the arrow M so that the track 76 is inserted into the grooves 81 and 82 of the rail 80. As a result, the track 76 and rail 80 are engaged with each other, thereby allowing the air bag case to be firmly assembled to the hub 51 of the steering wheel 50.

In an engaged state between the track 76 and the rail 80, the movable jaws 91 and 92 formed at the track 76 are caught by the fixed jaws 93 and 94 formed at the rail 80, thereby preventing the track 76 from being separated from the grooves 81 and 82 of the rail 80. In this way, the air bag case can be firmly assembled to the hub 51 of the steering wheel 50 through a simple assembly procedure as stated above.

As apparent from the above description, the present invention provides an air bag case assembly comprising a track mounted to the air bag case, and a rail mounted to the hub of a steering wheel and configured to allow the track to engage therein. In a ready state wherein the track is positioned so as to engage into grooves of the rail along a circumferential direction of the hub of the steering wheel, as the air bag case is rotated so that the track is inserted into the grooves of the rail, the track and rail are engaged with each other, resulting in the firm assembly of the air bag case. According to the air bag case assembly, it is possible to eliminate the use of separate fastening tools, and to enable the air bag case to be simply assembled to the hub of the steering wheel through only one rotating action thereof.

Further, according to the present invention, since the air bag case is assembled to the hub of the steering wheel as an operator simply rotates the air bag case at the upper side thereof, the operator can perform the assembly work of the air bag case in a convenient posture without bending his/her back.

Furthermore, according to the present invention, during the assembly of the air bag case, there is no risk of wear or breakage of components, resulting in an improvement in assembly productivity.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An air bag case assembly comprising:
   an air bag case disposed on a hub centrally provided in a steering wheel, the air bag case being installed therein with an air bag, and an inflator that supplies expansion gas to the air bag;
   a rail mounted to the hub of the steering wheel, the rail having a first groove defined at the side of the air bag case, and a second groove defined at the side of the hub of the steering wheel, the first groove having a width narrower than a width of the second groove; and
   a track mounted to the air bag case, the track having a first portion located at the side of the air bag case, and a second portion located at the side of the hub of the steering wheel, the first portion having a width narrower than a width of the second portion, in correspondence to the grooves of the rail, so that the track is engaged into the grooves of the rail, thereby allowing the air bag case to be assembled to the hub of the steering wheel.

2. The assembly as set forth in claim 1, wherein the rail is open at both ends thereof in an insertion direction of the track.

3. The assembly as set forth in claim 1, wherein the rail includes:
   a connector including the grooves of the rail; and
   a stand located between the connector and the hub of the steering wheel.

4. The assembly as set forth in claim 1, wherein the grooves of the rail and the track have an upside-down "T"-shaped cross sectional shape.

5. The assembly as set forth in claim 3, wherein a portion of the stand at the side of the hub of the steering wheel is bent perpendicular to the remaining portion thereof so that the bent portion of the stand comes into contact with the bottom of the hub of the steering wheel and is fastened to the hub of the steering wheel by bolts.

6. The assembly as set forth in claim 1, wherein the track is formed at an outer rim region of the air bag case; and
   the rail is located at the hub of the steering wheel so that it is aligned with the track.

7. The assembly as set forth in claim 1, wherein the track and the rail are formed to have an arc shape having the same curvature as that of the hub of the steering wheel, so that they are engaged with each other as the air bag case is rotated along a circumferential direction of the hub of the steering wheel.

8. The assembly as set forth in claim 1, further comprising:
   a stopper for fixing the rail and track at an engaged position.

9. The assembly as set forth in claim 8, wherein the stopper includes:
   two pairs of movable jaws protruding outwardly from both side surfaces of the track, one pair of the movable jaws being spaced apart from the other pair in an engagement direction between the track and rail; and
   two pairs of fixed jaws protruding inwardly from the grooves of the rail so that they are caught by the movable jaws between the movable jaws in a state wherein the track is engaged into the rail.

10. The assembly as set forth in claim 9, wherein the one pair of the movable jaws, to be first inserted into the grooves of the rail, is formed with a pair of tapers at surfaces thereof facing the engagement direction between the track and rail.

11. The assembly as set forth in claim 9, wherein the fixed jaws are formed with tapers at surfaces thereof facing an opposite direction of the engagement direction between the track and rail for securing passage of the one pair of the movably jaws, which are first inserted into the grooves of the rail.

* * * * *